(12) United States Patent
Lee

(10) Patent No.: US 9,289,083 B2
(45) Date of Patent: Mar. 22, 2016

(54) FOOD CONTAINER WITH DISCARD COMPARTMENT

(71) Applicant: Robert Lee, Harvey, LA (US)

(72) Inventor: Robert Lee, Harvey, LA (US)

( * ) Notice: Subject to any disclaimer, the term of this patent is extended or adjusted under 35 U.S.C. 154(b) by 67 days.

(21) Appl. No.: 14/053,816

(22) Filed: Oct. 15, 2013

(65) Prior Publication Data

US 2015/0102041 A1  Apr. 16, 2015

(51) Int. Cl.
| | |
|---|---|
| *A47G 19/02* | (2006.01) |
| *A47G 19/06* | (2006.01) |
| *A47G 23/06* | (2006.01) |
| *B65D 1/24* | (2006.01) |
| *B65D 1/36* | (2006.01) |
| *B65D 25/04* | (2006.01) |
| *B65D 57/00* | (2006.01) |
| *B65D 85/00* | (2006.01) |
| *A47G 19/00* | (2006.01) |
| *A47G 23/00* | (2006.01) |
| *A47G 19/30* | (2006.01) |

(52) U.S. Cl.
CPC ................ *A47G 19/30* (2013.01); *A47G 19/00* (2013.01); *A47G 19/02* (2013.01); *A47G 19/06* (2013.01); *A47G 23/06* (2013.01)

(58) Field of Classification Search
CPC ..... A47G 19/02; A47G 19/065; A47G 19/06; A47G 23/06; B65D 2543/00296; B65D 2543/00537; B65D 2251/1025
USPC .................................................. 220/526, 575
See application file for complete search history.

(56) References Cited

U.S. PATENT DOCUMENTS

| | | | |
|---|---|---|---|
| 2,335,016 A | 11/1943 | Blum et al. | |
| 3,381,875 A | 5/1968 | Tunick | |
| 4,151,910 A | 5/1979 | Yasur | |
| 6,050,442 A * | 4/2000 | Wysocki | 220/524 |
| 6,079,586 A * | 6/2000 | Hanneman | 220/526 |
| 6,196,412 B1 | 3/2001 | Cattell | |
| 7,784,635 B2 * | 8/2010 | Luburic | 220/505 |
| 7,946,422 B1 | 5/2011 | Bjerke | |
| 8,074,841 B1 | 12/2011 | Craig et al. | |
| 2005/0161424 A1 | 7/2005 | Hogan | |
| 2012/0199546 A1 | 8/2012 | Dieni | |

* cited by examiner

*Primary Examiner* — Fenn Mathew
*Assistant Examiner* — Andrew T Kirsch
(74) *Attorney, Agent, or Firm* — Keaty Law Firm LLC

(57) ABSTRACT

A food container is divided into two compartments by a vertically extending partition wall. A user selects which of the two compartments will hold a food product and which compartment will receive inedible parts of the food product after edible part of the food product is consumed. A snap-on lid closes the container to retain the food product and discarded inedible parts inside the container. Flap openings in the lid allow access to the compartments.

3 Claims, 2 Drawing Sheets

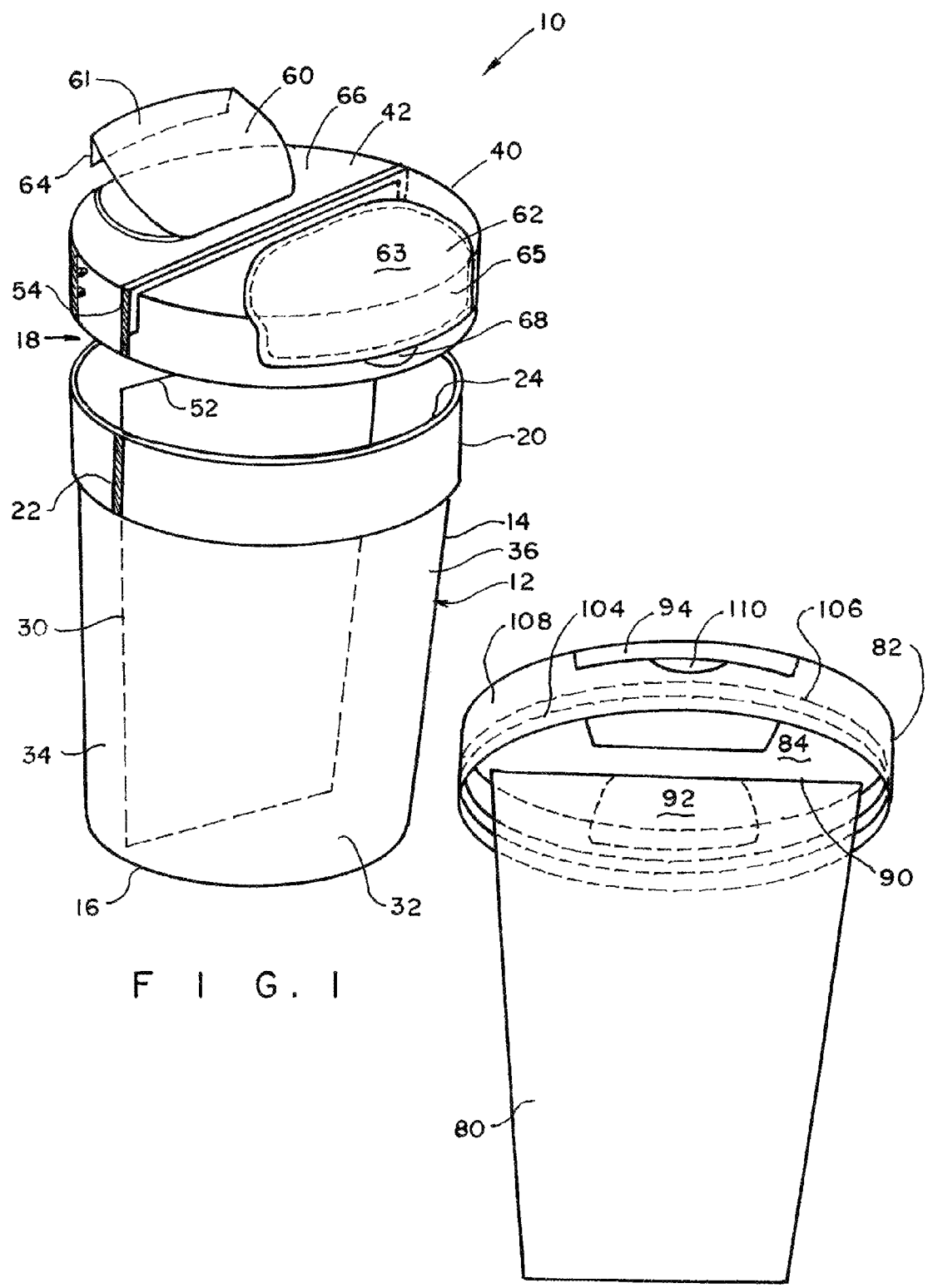

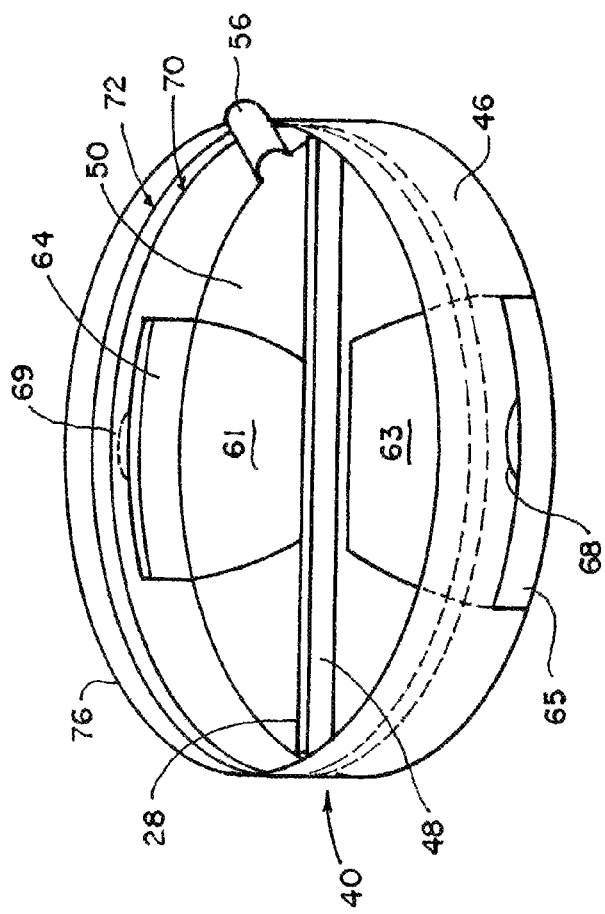
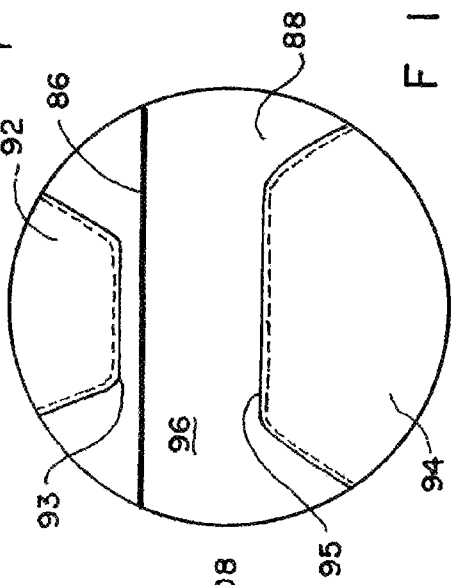
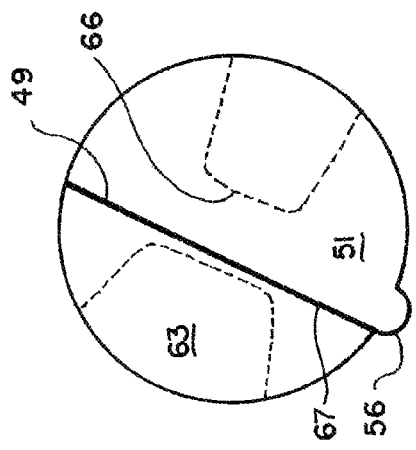
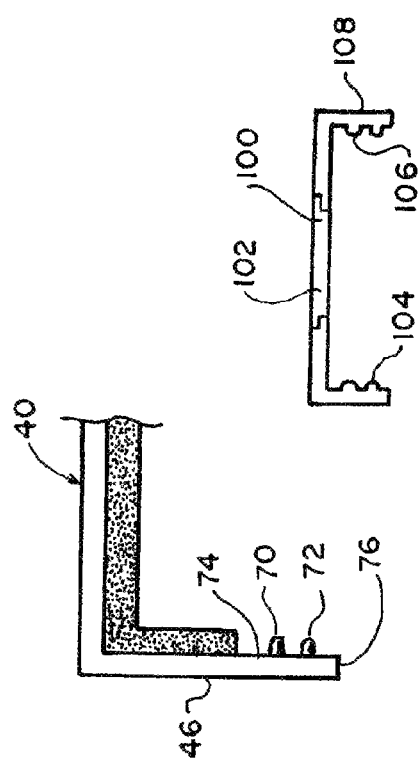

FOOD CONTAINER WITH DISCARD COMPARTMENT

BACKGROUND OF THE INVENTION

This invention relates to food containers, and more particularly to a container having two distinct compartments: one for storing foodstuffs and another—for receiving inedible portions of foodstuffs.

Many people enjoy eating snacks while watching television, going to the movies, attending a sporting event, reading a book, etc. Some of the most popular snacks are natural food products, such as fruit and seeds. Many of the natural foodstuffs have edible portion and inedible portion, such as shells and pits. The edible part of the natural snack is consumed, while the inedible part is disposed of as waste.

Conventionally, shelled nuts and seeds are sold in plastic bags or small cups. The user removes the seeds from the bag, cracks the seed and consumes the kernel, while the shell remains as waste. The inedible part of the natural snack must be collected and properly disposed in a sanitary manner. However, the market does not appear to have provided an easy solution to collecting inedible portions of the foodstuffs, such as nut shells, in immediate association with a container for the foodstuff.

One of the known solutions to collect spent shells, such as sunflower shells, is discussed in U.S. Application Publication No. 2005/0161424 published on Jul. 28, 2005 and entitled "Sunflower Seed Dispenser and Shell Disposal Container." This application discloses a dual-compartment container designed specifically to dispense unshelled sunflower seeds and to hold sunflower seed refuse. The container comprises a dispenser compartment, a disposal compartment, and a dividing wall. The two compartments are separately blow molded, and the dividing wall is made up of one surface of the dispenser compartment and one surface of the disposal compartment. The two compartments are held together by packaging and/or surface mating means, such as snaps. The dispenser compartment contains sunflower seeds, and the disposal compartment contains sunflower seeds refuse, which includes sunflower seed shells. Each of the compartments comprises a neck and a cap. The neck of the disposal compartment is situated on top of the container and is wider than the neck of the dispenser compartment to facilitate spitting refuse into the disposal compartment.

Another example of a dual-compartment container is disclosed in U.S. Pat. No. 8,074,841 issued on Dec. 13, 2011 to Darrin L. Craig et al and entitled for "Food Containers and Dispensers with Dual Compartments for Storage and Disposal." The assembly according to the '841 patent includes a first compartment that defines a first cavity and a second compartment that is moveable in relation to the first compartment. In a first position, a portion of the first compartment is contained within the second compartment and, in a second position, the second compartment defines a second cavity. The container also includes a tube coupled to the first opening and the first cavity such that food contained in the first cavity can be dispensed through the second opening. The lid has flaps, which pivot against a stationary portion of the lid. The stationary portion extends between the flaps.

While these solutions may work in various environments, there exists a need for a inexpensive simple-to-use dual-compartment container capable of receiving inedible portions of consumed foodstuffs.

SUMMARY OF THE INVENTION

It is, therefore, an object of the present invention to provide a food container having a discard compartment.

It is another object of the invention to provide a food container having distinct compartment for retaining foodstuffs and discarded portions of the foodstuffs.

It is a further object of the invention to provide a dual-compartment container having easy access to both compartments.

These and other objects of the invention are achieved through a provision of a food container is divided into two compartments by a vertically extending partition wall. A user selects which of the two compartments will hold a food product and which compartment will receive inedible parts of the food product after edible part of the food product is consumed. A snap-on lid closes the container to retain the food product and discarded inedible parts inside the container. Flap openings in the lid allow access to the compartments. The food container can be used for sunflower seeds, cherries, peanuts, pistachios or other food product having an edible part and an inedible part that is discarded as the food product is consumed.

BRIEF DESCRIPTION OF THE DRAWINGS

Reference will now be made to the drawings, wherein like parts are designated by like numerals, and wherein FIG. 1 is a plan view of the food container according to the present invention.

FIG. 2 is a top plan view of lid member.

FIG. 3 is a perspective view of the inverted lid member.

FIG. 4 is a detail view of the lid member showing snap members.

FIG. 5 is a plan view of an alternative embodiment of the lid member for the food container according to the present invention.

FIG. 6 is a top plan view of the lid member according to the alternative embodiment.

FIG. 7 is a cross sectional view of the lid member of FIG. 6 showing a flap overlap.

DETAIL DESCRIPTION OF THE INVENTION

Turning now to the drawings in more detail, numeral 10 designates the food container according to the present invention. The food container 10 comprises a hollow container body 12 having a continuous sidewall 14, a closed bottom 16 extending between the sidewall 14 and an open top 18. In one of the preferred embodiments, the container body 12 is formed as a cylindrical member of about six to seven inches (15.24-17.78 cm) high and about 2 to three inches (5-7.62 cm) wide. The continuous sidewall 14 can be 0.05-0.07 inches (0.12-0.18 cm) thick. Of course, these dimensions are exemplary and other dimensions may be selected by the manufacturer.

The sidewall 14 is provided with an exterior peripheral rim 20 at the upper part thereof. The rim 20 can be 0.6 to 0.8 inches (1.52-2.03 cm) wide. A vertical alignment projection 22 extends from a top edge 24 of the container body 12 to a bottom 26 of the rim 20. The alignment projection 22 is aligned with a lid alignment groove 28 as will be described in more detail hereinafter.

A vertical partition wall 30 extends from the bottom 16 of the container body 12 to a distance above the open top 18 of the container body 12. The partition wall 30 divides an interior chamber 32 of the container body 12 into two distinct compartments 34 and 36. In one exemplary embodiment, the partition wall 30 extends above the top edge of the container body 12 by some 9/16" (14.29 mm). In one of the exemplary embodiments, the first compartment 34 occupies about 70% of the volume of chamber 32, while the second compartment 36 occupies about 30% of the volume of the interior chamber 32. The planar partition wall 30 can be unitary formed with the container body 12, for instance molded as one piece with the container body 12.

Depending on the food item being housed in the container body 12, either the chamber 34 or chamber 36 can be designated as a discard compartment. For instance, if the container 10 is designed to house sunflower seeds, the smaller compartment 36 may hold unshelled sunflower seeds, and the larger compartment 34 being designated as the discard compartment will receive shells of the sunflower seeds. In another example, the container 10 is designed to hold cherries the larger compartment 34 will hold the fruit, while the smaller compartment 36 will be designated as the discard compartment for cherry pits.

A lid member 40 is detachably securable with the open top 18 of the container body 12. The lid member 40 comprises a substantially planar top 42 and downwardly depending lid flange 46. The planar top 42 is at least slightly greater than the open top 18 allowing the flange 46 to fit over the rim 20. The vertical extension of the lid flange 46 does not have to match the vertical dimension of the rim 20. In one exemplary embodiment, the lid flange is about 7/8" (22.22 mm) wide and 1/32" (0.79 mm) thick.

An alignment groove 48 extends through an interior surface 50 of the lid member 40. The alignment groove 48 receives an upper edge 52 of the partition wall 30 when the lid member 40 is fitted on the container body 12. A portion 54 of the alignment groove 48 extends along the flange 46; the portion 54 receives the flange projection 22 therein. To further facilitate quick alignment of the lid member 40, a small extension 56 is formed on the planar top 42 adjacent the alignment groove 48. The extension 56 visually assists a user in aligning the receiving groove 48 with the upper edge 52 of the partition wall 30.

Alignment indicia 49 can be made on an exterior surface 51 of the planar top 42 to further aid the user in identifying location of the alignment groove 48. It is envisioned that the alignment indicia 49 will be particularly useful if the lid member 40 is formed from a non-transparent material.

The lid member 40 is provided with a pair of access openings selectively closable by pivotal flaps 60, 62. The pivotal flap 60 allows access to the compartment 34, while the flap 62 allows access to the compartment 36. The flaps 60 and 62 each have a top planar surface 61, 63, respectively, and downwardly depending flange parts 64, 65, respectively. The flange parts 64, 65 substantially follow the configuration of the lid flange 46 in encircling the rim 20 of the container body 12. The flap 60 pivots against a pivot line 66 where the flap 60 is attached to the planar top 42, and the flap 62 pivots against a pivot line 67, where the flap 62 is attached to the planar top 42. The pivot lines 66 and 67 are substantially parallel to the alignment groove 28, which receives the top 52 of the partition wall 30.

An angled indentation 68 is formed in the lid flange 46 in general alignment with the flange part 65. A similar angled indentation 69 is formed in the lid flange 46 in general alignment with the flange part 64. The indentations 68, 69 allow a user to easily lift the flaps 62, 60 to gain access to the compartments 34, 36.

The lid member 40 snaps over the top of the container body 12. To facilitate a more secure engagement of the lid member 40 with the rim 20, a pair of spaced apart circumferential rings 70, 72 is formed on an interior surface 74 of the lid flange 46. The rings 70, 72 extend outwardly from the interior surface 74 to seal the contact between the lid member 40 and the rim 20. In one aspect of the invention the ring 72, which is located closer to the edge 76 of the lid flange 46 is smaller than the ring 70. In one exemplary embodiment, the ring 70 is 1/8" high (3.175 mm) and 1/16" (1.159 mm) wide, while the ring 72 is 1/32" (0.79 mm) high and 1/16" (1.59 mm) wide.

In operation, a user removes the lid member 40 from the container body 12 and deposits a food item in a food compartment. It will be appreciated that the user selects which of the compartment 32 or 34 will be designated as the discard compartment depending on the type of the food item to be consumed. The user then aligns the lid member 40 with the upper edge 52 of the partition wall 30 and snaps the lid member 40 over the rim 20 of the container body 12.

To retrieve the food item from the container body 12, the user lifts the flap 60 or 62 by pivoting the flap along the respective pivot line and withdraws the food item from the inner compartment. The user consumes the edible part of the food item and discards the inedible part of the food item into the designated discard compartment. In the step, the flap of the discard compartment is lifted to expose the open top of the compartment and the user deposits the discarded material into the discard compartment.

The container 10 can be made disposable or re-usable depending on the manufacturer's preference. If the container 10 is made reusable, the user disposes of the inedible discarded material by inverting the container 12 and allowing the discarded material to fall out of the container body 12 by gravity. The user washes the container and makes it ready for another use.

If desired, the exterior surface of the container body 12 can be decorated with any design, advertising indicia, logo of a sport team, drawing of the food item housed in the container or any other desired decorative indicia. The container 10 can be formed from recycled plastic, a composite material, a metal alloy, etc.

Turning now to FIGS. 5-7, an alternative embodiment of the present invention is shown in more detail. In this embodiment a partition wall 80 is formed unitary with the lid member 82. In this embodiment, the partition wall 80 extends downwardly from an inner surface 84 of the lid member 82 to the bottom of the container body. The partition wall 80, similarly to the partition wall 30, divides the interior chamber of the container body into two distinct compartments—a food-receiving compartment and a discard compartment. An indicia line 86 is made on an exterior surface 88 of the lid member 82. The indicia line 86 corresponds to position of the top end 90 of the partition wall 80.

Similarly to the first embodiment, the inner compartments need not be equal in volume. In one exemplary embodiment, the partition wall 80 divides the interior of the container body into a first compartment occupying about 30% of the inner chamber and a second compartment occupying about 70% of the interior chamber. Depending on the food item being housed in the container, either the first or the second compartment can serve as a discard compartment.

The lid member 82 is provided with a pair of access openings selectively closable by pivotal flap members 92 and 94 allowing access to the container interior. The flap member 92 pivots along a pivot line 93 in relation to the lid's planar surface 96, while the flap member 94 pivots along a pivot line 95 in relation to the planar surface 96. The pivot lines can be parallel to the dividing indicia line 86. A food product is deposited into a user-selected food compartment after the lid member is snapped over the open top of the container body through one of the access openings.

An irregular groove 100 is formed in the lid planar surface 96 to receive the flap member 94. The groove 100 is provided with a step-up shoulder, which the flap member 94 contacts when in a closed position. If desired, a similar groove may be made for receiving the flap member 92.

The lid member 82 is provided with a pair of circumferential sealing ribs 104 and 106 formed on an inner surface of the lid flange 108. The sealing ribs firmly engage the container rim when the lid member 82 is snapped over the open top of the container. An indentation 110 can be provided on the lid flange 108 to help lift the flap member 94. A similar indention can be provided on the opposite side of the lid flange 108 in general alignment with the flap member 92.

It will be appreciated that the partition wall 82 frictionally fits within the interior of the food container, contacting the interior wall of the food container and the bottom thereof. In use, the user positions the lid with the unitary formed partition wall into the container chamber and lifts one of the flap members 92 or 94. The user then deposits a food item through an opening in the lid member 82. The food item is consumed, and the inedible part of the food item is discarded into the discard container.

It is envisioned that the lid member 82 can be manufactured with different size partition walls. For instance, for a small container, the vertical dimensions of the partition wall 80 can be between 4 and 5 inches (10.16-12.7 cm) long. For larger containers the vertical dimensions of the partition wall 80 can be between 7 and 8 inches (17.78-20.32 cm) long. Of course, other dimensions can be selected, if desired, with one of the possible variations is a partition wall of a standard drinking cup size to fit approximately 12 oz (340 ml) and 20 oz (567 ml) cups. Both such size cups fit in normal vehicle cup holder.

The food container of the instant invention has a minimum number of parts, which makes it easier to manufacture. The snap-up lid with a pair of snap openings allows for straightforward use for a wide variety of food items. Simple ribs forming one groove in between and parallel to the hinged openings keep the lid openings correctly situated with respective new/discard compartments.

The snap-on lids keep the food product sealed for freshness, and refuse sealed from spillage. The lid member does not move, slide, or spins. No folding, or bending of the container is needed for dividing inedible discarded material from fresh product.

The food container and its associated parts are dishwasher safe, easy to clean and use numerous times. No paper products are involved in the manufacture of the food container of this invention.

Many changes and modifications can be made in the design of the present invention without departing from the spirit thereof. I, therefore, pray that my rights to the present invention be limited by the scope of the appended claims.

I claim:

1. A food container device, comprising:
    a container body having an inner chamber, a closed bottom, a continuous peripheral sidewall, an exterior peripheral rim with an outwardly extending alignment projection, and an open top;
    a lid member detachably engageable with the open top of the container body and having a lid interior surface, a planar top surface, a downwardly extending lid flange, a pair of access openings, and a pair of flap members selectively closing the access openings, said flap members being pivotally oriented in relation to the top surface along respective pivot lines;
    a partition wall extending from the bottom of the container and engaging an interior surface of the lid member when secured to the container body, the partition wall having an upper edge, which extends above the top of the container body, said partition wall dividing the inner chamber into a food compartment configured to store a food product therein and a discard compartment configured to receive inedible parts of the food product after the edible part of the food product in the food compartment has been consumed; and
    wherein the lid member is provided with an alignment groove on the lid interior surface, said alignment groove receiving a top edge of the partition wall therein, the alignment groove extending across the lid interior surface and downwardly along the lid flange, the alignment groove receiving the alignment projection of the rim of the container body.

2. The device of claim 1, wherein the pivot lines are oriented in a substantially parallel relationship to the alignment groove.

3. The device of claim 1, said lid member is provided with an extension part adjacent the alignment groove.

\* \* \* \* \*